US010582356B2

(12) United States Patent
Jia et al.

(10) Patent No.: US 10,582,356 B2
(45) Date of Patent: Mar. 3, 2020

(54) DYNAMIC MANAGEMENT OF DEFAULT SUBCARRIER SPACING FOR 5G OR OTHER NEXT GENERATION NETWORK

(71) Applicant: AT&T Intellectual Property I, L.P., Atlanta, GA (US)

(72) Inventors: Yupeng Jia, Austin, TX (US); Yonghui Tong, Alpharetta, GA (US); Hongyan Lei, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/958,047

(22) Filed: Apr. 20, 2018

(65) Prior Publication Data
US 2019/0327592 A1 Oct. 24, 2019

(51) Int. Cl.
*H04W 4/60* (2018.01)
*H04W 8/24* (2009.01)
(Continued)

(52) U.S. Cl.
CPC ............ *H04W 4/60* (2018.02); *H04L 5/0048* (2013.01); *H04W 8/245* (2013.01); *H04W 52/0209* (2013.01)

(58) Field of Classification Search
CPC ... H04W 4/60; H04W 8/245; H04W 52/0209; H04L 5/0048
See application file for complete search history.

(56) References Cited

U.S. PATENT DOCUMENTS

| 8,839,387 B2 | 9/2014 | Raleigh |
| 9,351,236 B2 | 5/2016 | Fan et al. |

(Continued)

FOREIGN PATENT DOCUMENTS

| TW | 201635847 A1 | 10/2016 |
| WO | 2017029465 A1 | 2/2017 |

(Continued)

OTHER PUBLICATIONS

Das, Suvra S., "Performance analysis of OFDM systems with adaptive sub carrier bandwidth." IEEE transactions on wireless communications 7.4 (2008): 1117-1122. https://www.researchgate.net/profile/E_De_Carvalho publication /3434462_Performance_Analysis_of_OFDM_Systems_with_Adaptive_Sub_Carrier_Bandwidth/links/54d87d8b0cf24647581a8375/Performance-Analysis-of-OFDM-Systems-with-.

(Continued)

*Primary Examiner* — George Eng
*Assistant Examiner* — Hung K Du
(74) *Attorney, Agent, or Firm* — Amin, Turocy & Watson, LLP

(57) ABSTRACT

In one embodiment, a method can comprise sending identification data representative of an identification of a base station device to a subscriber identity module. In response to the sending the identification data, the method can comprise receiving status data representative of a response from the subscriber identity module, and based on the receiving the status data, sending, fetch data representative of a command to be acquired from the subscriber identity module. Additionally, the method can comprise receiving, from the subscriber identity module, command data associated with the command to be performed by the mobile device. Furthermore, based on the receiving the command data, the method can comprise sending, to the base station device, response data representative of whether the command has been determined to have been performed.

20 Claims, 12 Drawing Sheets

(51) Int. Cl.
*H04W 52/02* (2009.01)
*H04L 5/00* (2006.01)

(56) References Cited

U.S. PATENT DOCUMENTS

| | | |
|---|---|---|
| 9,942,094 B1 | 4/2018 | Kovacevic et al. |
| 9,942,227 B2 | 4/2018 | Chastain et al. |
| 2003/0073440 A1* | 4/2003 | Mukherjee ............ H04L 29/06 455/435.1 |
| 2004/0147284 A1* | 7/2004 | Laumen ............... H04W 92/08 455/558 |
| 2016/0270013 A1* | 9/2016 | Soriaga ............ H04W 56/0015 |
| 2018/0014268 A1 | 1/2018 | Kuppusamy et al. |
| 2018/0035416 A1 | 2/2018 | Yi et al. |
| 2018/0083972 A1 | 3/2018 | Kim |
| 2018/0084593 A1 | 3/2018 | Chen et al. |
| 2018/0098298 A1 | 4/2018 | Jung et al. |

FOREIGN PATENT DOCUMENTS

| | | |
|---|---|---|
| WO | 2017135020 A1 | 8/2017 |
| WO | 2017135044 A1 | 8/2017 |
| WO | 2017135213 A1 | 8/2017 |
| WO | 2018012618 A1 | 1/2018 |
| WO | 2018012878 A1 | 1/2018 |
| WO | 2018028490 A1 | 2/2018 |
| WO | 2018028542 A1 | 2/2018 |
| WO | 2018028775 A1 | 2/2018 |
| WO | 2018064068 A1 | 4/2018 |

OTHER PUBLICATIONS

3GPP, "TR 38.802 V2.0.0," 3rd Generation Partnership Project; Technical Specification Group Radio Access Network; Study on New Radio (NR) Access Technology; Physical Layer Aspects (Release 14), Mar. 2017, 134 pages.
3GPP, "New WID on New Radio Access Technology," 3GPP TSG RAN Meeting #75, Dubrovnik, Croatia, Mar. 6-9, 2017, 8 pages.

* cited by examiner

DYNAMIC MANAGEMENT OF DEFAULT SUBCARRIER SPACING FOR 5G OR OTHER NEXT GENERATION NETWORK

TECHNICAL FIELD

This disclosure relates generally to facilitating a reduction in device initial access power consumption. For example, this disclosure relates to facilitating a reduction in device initial access power consumption by dynamically managing default subcarrier spacing for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to dynamic management of default subcarrier spacing is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
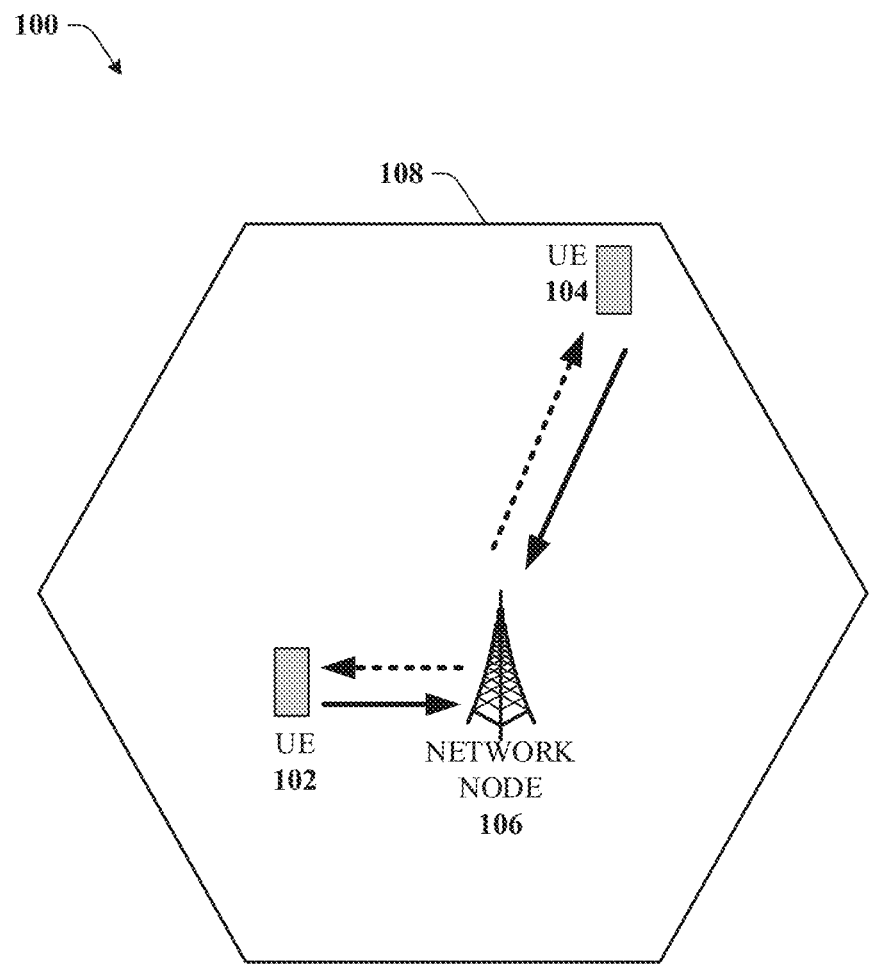
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate dynamic management of default subcarrier spacing for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate dynamic management of default subcarrier spacing for a 5G network. Facilitating dynamic management of default subcarrier spacing for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

NR access technology can enable future cellular networks, deployment scenarios, and applications. The support of different subcarrier spacing (SCS) for synchronization and data transmissions can avoid unnecessarily complex or restricted operation of different features or services when they are introduced. The fixed SCS (15 kHz) for a synchronization signal (SS) or SS block can be defined as 3GPP RAN4, defined as a dual SCS for SS, or a physical broadcast channel (PBCH) block for certain NR bands (e.g., band n5, band n66, band n260, etc.).

TABLE 1

Applicable SS raster entries per NR operating band

| NR Operating Band | SS Block SCS |
| --- | --- |
| n1 | 15 kHz |
| n2 | 15 kHz |
| n3 | 15 kHz |
| n5 | 15 kHz |
| n5 | 30 kHz |
| n7 | 15 kHz |
| n8 | 15 kHz |

TABLE 1-continued

Applicable SS raster entries per NR operating band

| NR Operating Band | SS Block SCS |
| --- | --- |
| n20 | 15 kHz |
| n28 | 15 kHz |
| n38 | 15 kHz |
| n41 | 15 kHz |
| n50 | 15 kHz |
| n51 | 15 kHz |
| n66 | 30 kHz |
| n66 | 120 kHz |
| n257, n258, n260 | 240 kHz |

For example, the dual SCS scenario can utilize an n260 (37 GHz-40 GHz) frequency band. Given the existence of non-contiguous 50 MHz allocations in bands above 24 GHz, support of a minimum bandwidth of 50 MHz can allow operators to fully utilize allocated spectrum. This implies that support for 120 kHz SS or PBCH blocks can be utilized.

In the case of standalone NR operation, the UE can blindly detect the presence of SS blocks in a given band when performing initial access (e.g., registering with the network) without knowledge of the actual system bandwidth. Thus, the default numerology that the UE assumes for a given band can correspond to the minimum carrier bandwidth.

However, this should not preclude support for 240 kHz SS or PBCH block SCS in these bands in cases where non-standalone (NSA) or standalone (SA) NR is utilized and 100 MHz of carrier bandwidth is available. In these cases, the network can configure 240 kHz SCS for faster initial access than using 120 kHz SCS. Therefore, for the UE to perform an initial access procedure, depending on network configuration, the UE can see two SCS possibilities (e.g., 20 kHz, or 240 kHz SCS).

When dual SCSs are supported for a single mmWave frequency band, a 3GPP defined network can adopt either 120 kHz or 240 kHz SCS for the SS or PBCH block transmission. The network can also indicate selected SCS for SS or PBCH block transmissions to the UE. If there is no indication of the SCS used for the SS or PBCH block transmission on a target NSA carrier, then the UE can assume that the default SCS for the SS or PBCH block transmission is used.

If the default SCS on the UE does not match the network configured SCS for the SS or the PBCH block transmission, then the UE can consume additional power during the registration process. For example, if the network configures 240 KHz SCS for the SS or the PBCH block transmission, the UEs will waste power if it uses 120 KHz SCS scanning until it tries the correct 240 Hz SCS for the SS block. The aforementioned problem, found in band n260, also exists in certain sub 6NR bands (e.g., band n5, n66, etc.), which have 15 kHz and 30 KHz SS block SCS supported as default values for SCS. If the UE does not know the minimum system bandwidth and default SCS value, then the UE will detect the SS block blindly, which can cause the UE to consume power.

To address the aforementioned scenarios, a default SCS can be set for the SS or the PBCH block on a subscriber identity module (SIM) card or a universal integrated circuit card (UICC) of the UE. It should be noted that for purposes of this disclosure, the terms SIM and UICC can be used interchangeably. The SIM card can allow the UE to store and convey the last successfully registered SCS value to a network server, let the network track NR device capabilities, and modify the default SCS for the SS or the PBCH block via an over the air (OTA) message.

The default operator SCS for the SS or the PBCH block can be stored on the UE's SIM or the UICC for those bands supporting dual SCS for the SS or the PBCH. The default value can then be updated when network configuration changes. The applet of an existing SIM toolkit (STK) application, on resident SIM cards, can be used to collect the following information: international mobile equipment identity (IMEI), international mobile equipment identity software version (IMEISV), terminal profile, location, mobile country code (MCC), mobile national code (MNC), location area code (LAC), type allocation code (TAC), Cell ID, terminal support table contents, etc.

Except for the terminal support table, all other data can be collected per 3GPP. The terminal support table can use a mechanism where a byte is allocated for a particular key feature. A value can also be defined to indicate support or no support of that feature. The terminal support table can be used to define the default SCS value for the SS or the PBCH block for those bands that support dual SCS values. The UE can then utilize the existing STK application, that is resident on operator SIM cards, to store the default SCS value for the SS or the PBCH block. A supporting terminal (e.g., base station device) can set the appropriate flags immediately after sending a terminal profile command to the SIM via the UE. The update to this flag can be prior to any fetch instruction being performed, although it can also be afterwards. However, the update can also occur before any terminal response message is sent back to the SIM. The network can store the last used SCS value when the device is successfully registered to the network. However, if the network configuration changes, then a new default value can be sent to UE, via an OTA message, and override the default SCS value for a specific band on the SIM card.

In one embodiment, described herein is a method comprising sending identification data representative of an identification of a base station device to a subscriber identity module. In response to the sending the identification data, the method can comprise receiving status data representative of a response from the subscriber identity module, and based on the receiving the status data, sending, fetch data representative of a command to be acquired from the subscriber identity module. Additionally, the method can comprise receiving, from the subscriber identity module, command data associated with the command to be performed by the mobile device. Furthermore, based on the receiving the command data, the method can comprise sending, to the base station device, response data representative of whether the command has been determined to have been performed.

According to another embodiment, a system can facilitate, transmitting, to a mobile device, identification data associated with an identification of a base station device. In response to the transmitting the identification data, the system can facilitate receiving status data representative of a status of a subscriber identity module. Based on the receiving the status data, the system can transmit fetch data to the subscriber identity module, the fetch data representative of data to be acquired by the mobile device. Additionally, in response to the transmitting the fetch data, the operations can comprise receiving command data from the subscriber identity module, the command data representative of a command to be performed by the mobile device. Furthermore, in response to the receiving the command data, the operations can comprise transmitting, to the base station device, response data associated with the command being determined to have been performed.

According to yet another embodiment, described herein is a machine-readable storage medium that can perform the operations comprising facilitating sending base station identification data representative of an identification of the base station device and facilitating receiving status data representative of a status of a mobile device. Based on the receiving the status data, the machine-readable storage medium can facilitate sending fetch data, to a subscriber identity module of the mobile device, representative of data to be fetched by the mobile device. Additionally, in response to the facilitating of the sending the fetch data, the machine-readable storage medium can facilitate receiving command data, representative of a command to be performed by the mobile device. Furthermore, based on the facilitating of the receiving the command data, the machine-readable storage medium that can perform the operations comprising facilitating sending response data, representative of whether the command has been determined to have been performed, to the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102, 104. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network node 106 represents an uplink (UL) communication.

System 100 can further include one or more communication service provider networks that facilitate providing wireless communication services to various UEs, including UE 102, via the network node 106 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 106 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
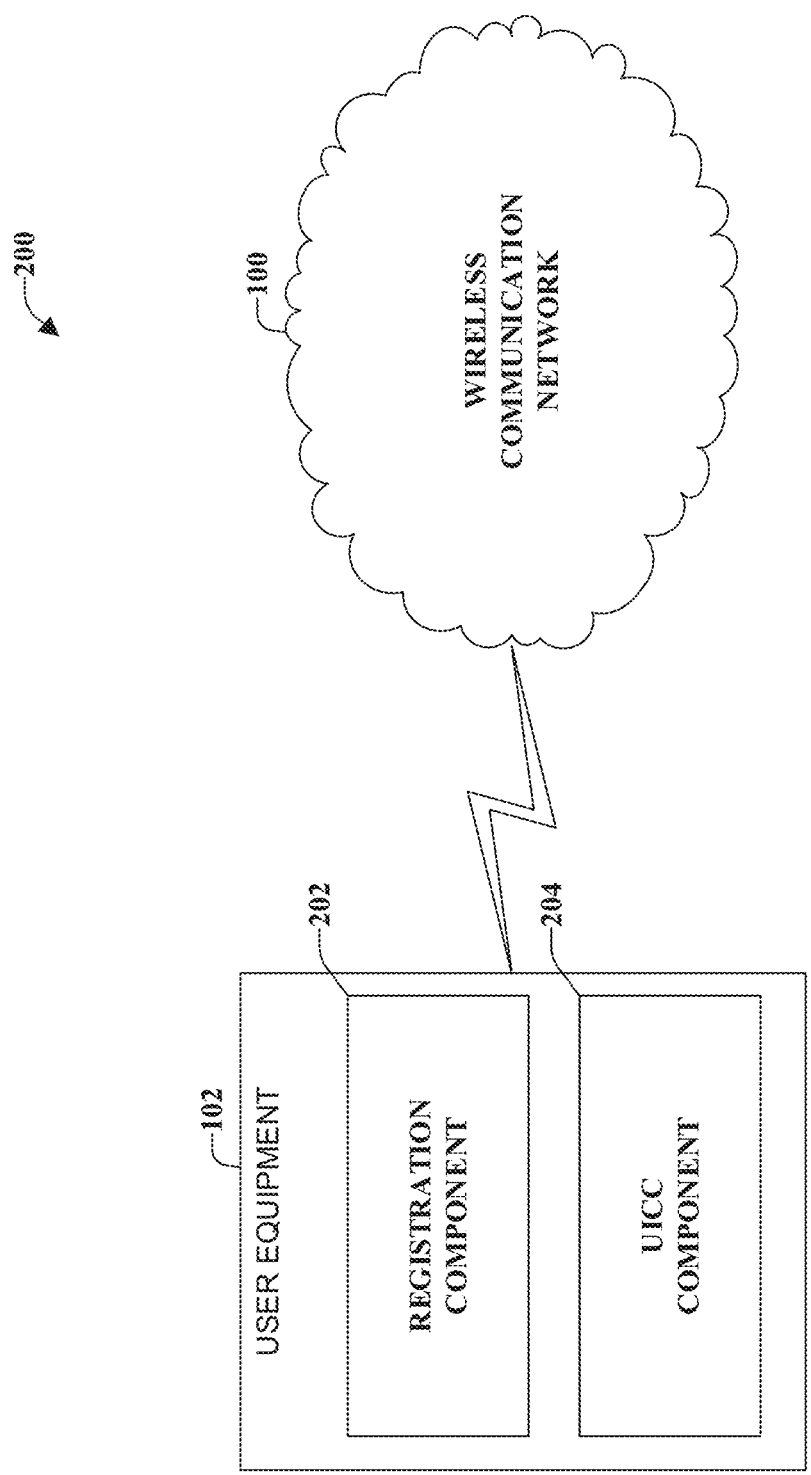
FIG. 2 illustrates an example schematic system block diagram of a wireless communication system according to one or more embodiments.

Referring now to FIG. 2, illustrated is an example schematic system block diagram of a wireless communication system according to one or more embodiments. The wireless communication system 200 can comprise the UE 102, and a wireless communication system 100. The UE 102 can be a wireless phone, a smart phone, a PDA, a laptop, and so forth. In operation, the UE 102 can send, transmits, or otherwise communicate one or more registration messages to the wireless communication system 100 via the network node 106 (as shown in reference to FIG. 1). The registration message can comprise registration data, such as a mobile device identifier, a subscriber identifier, subscription data, etc. In addition, the registration message can include a type of registration requested, such as a circuit switched registration (e.g. voice communication) and/or a packet switched registration (e.g. data communication).

The network node 106 can provide wireless service to one or more UEs 102. For instance, the service can include voice and/or data service. The network node 106 can communicate the registration message to the wireless communication system 100. The wireless communication system 100 can authenticate the registration attempt, and instruct the network node 106 to accept or deny the registration attempt. Based on the instruction received from the wireless communication system 100, the network node 106 can register the UE 102 or reject the UE 102. If the UE's 102 registration attempt is rejected, the network node 106 can transmit a rejection notification to the UE 102. The rejection notification can comprise data regarding the status or reason of the rejection, such as a rejection cause code.

When the UE 102 enters a location where it can communicate with the network node 106, the UE 102 can receive identification data, associated with an identification of the network node 106, from the network node 106. The default operator SCS for the SS or the PBCH block can then be stored on the UE's SIM or UICC component 204 for those bands supporting dual SCS for the SS or the PBCH. The default value can then be updated when the network configuration changes. For example, if the wireless communication system 100 changes its network configuration, then an applet of the UICC component 204, can be used to collect and/or store the following information: international mobile equipment identity (IMEI), international mobile equipment identity software version (IMEISV), terminal profile, location, MCC, MNC, LAC, TAC, cell ID, terminal support table contents, etc.

Consequently, the network node 106 can set a flag after sending a terminal profile command to the UICC component 204 via the UE 102. The updated flag can be set prior to any fetch instruction being performed, although it can also be set afterwards. However, the update can also occur before any terminal response message is sent back to the SIM. The network node 106 can also store the last used SCS value of when the UE 102 was successfully registered to the network node 106. However, if the network configuration changes, then a new default value can be sent to UE 102, via an OTA message, and override the default SCS value for a specific band on the UICC.

Figure 3:
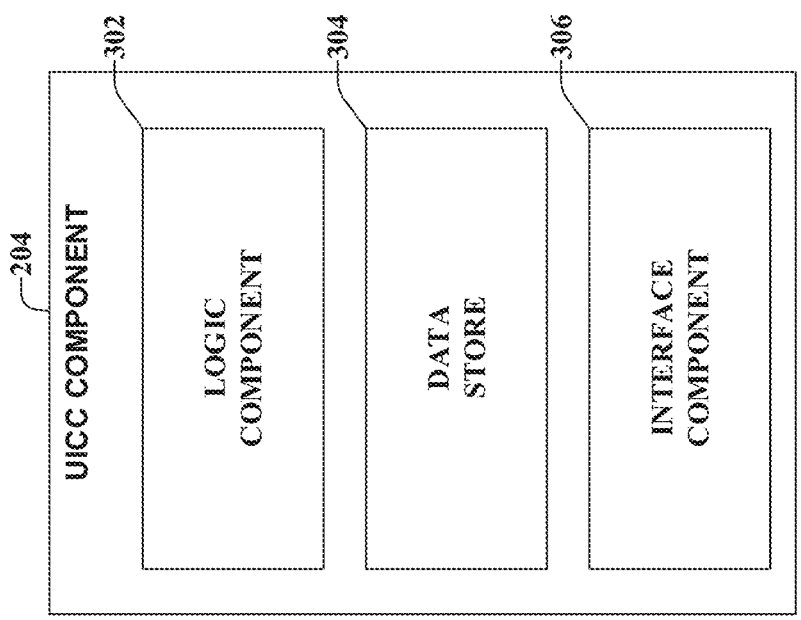
FIG. 3 illustrates an example schematic system block diagram of a universal integrated circuit card component according to one or more embodiments.

Referring now to FIG. 3, illustrated is an example schematic system block diagram of the UICC component. The UE 102 can comprise the registration component 202 and the UICC component 204. In operation, when the UE 102 desires to communicate with or through the wireless communication system 100, the registration component 202 can transmit one or more registration request messages to the wireless communication system 100. As previously discussed, the wireless communication system 100 can determine to accept or reject the registration request based at least in part on the registration request message. For instance, the registration request message can include a subscriber identifier. Based on the subscriber identifier the wireless communication system 100 can determine whether the mobile device has sufficient access privileges to be granted registration.

The UICC component 204 (e.g. smart card) can process and/or store data. For instance, the UICC component 204 can obtain the default operator SCS for the SS or the PBCH block, and based on the obtained information, can instruct the UE 102 to take some action. For example, the UICC component 204 can comprise a logic component 302, a data store 304, and an interface component 306. The logic component 302 can be an integrated circuit that is capable of processing data, wherein the UICC component 204 can comprise one or more applications and the logic component 302 can process the data via the applications and produce an output. The data store 304 can be a non-volatile storage memory capable of storing multiple data items, such as the terminal support table, and/or the default operator SCS for the SS or the PBCH block and UICC applications. The interface component 306 can include any suitable adapters, connectors, channels, communication paths, etc. to integrate the UICC component 204 into virtually any operating and/or database system(s). For instance, the interface component 306 can enable the UICC component 204 to communicate with the UE 102 and/or the network node 106.

As previously discussed, the UICC component 204 can obtain terminal profile data from the network node 106. The logic component 302 can analyze the terminal profile data, and based on the terminal profile data, determine an action to be taken. For instance, the logic component 302 can determine that the UE 102 (not shown) should display a message to the user based on the terminal profile data, such as "this is a previously recognized network node for which default operator SCS for the SS or the PBCH block has been stored." The logic component 302 can assist in determining whether the default operator SCS for the SS or the PBCH block is valid or should be adjusted to mitigate UE 102 power usage.

Additionally or alternatively, the UICC component 204 can log, track, or otherwise store the default operator SCS for the SS or the PBCH block data in the data store 304. For instance, the UICC component 204 can report or send the default operator SCS for the SS or the PBCH block to a server via the interface component 306 and the network node 106, wherein the server is associated with a service provider. Thus, the reported default operator SCS for the SS or the PBCH block can be retrieved from the server and analyzed by the service provider.

Figure 4:
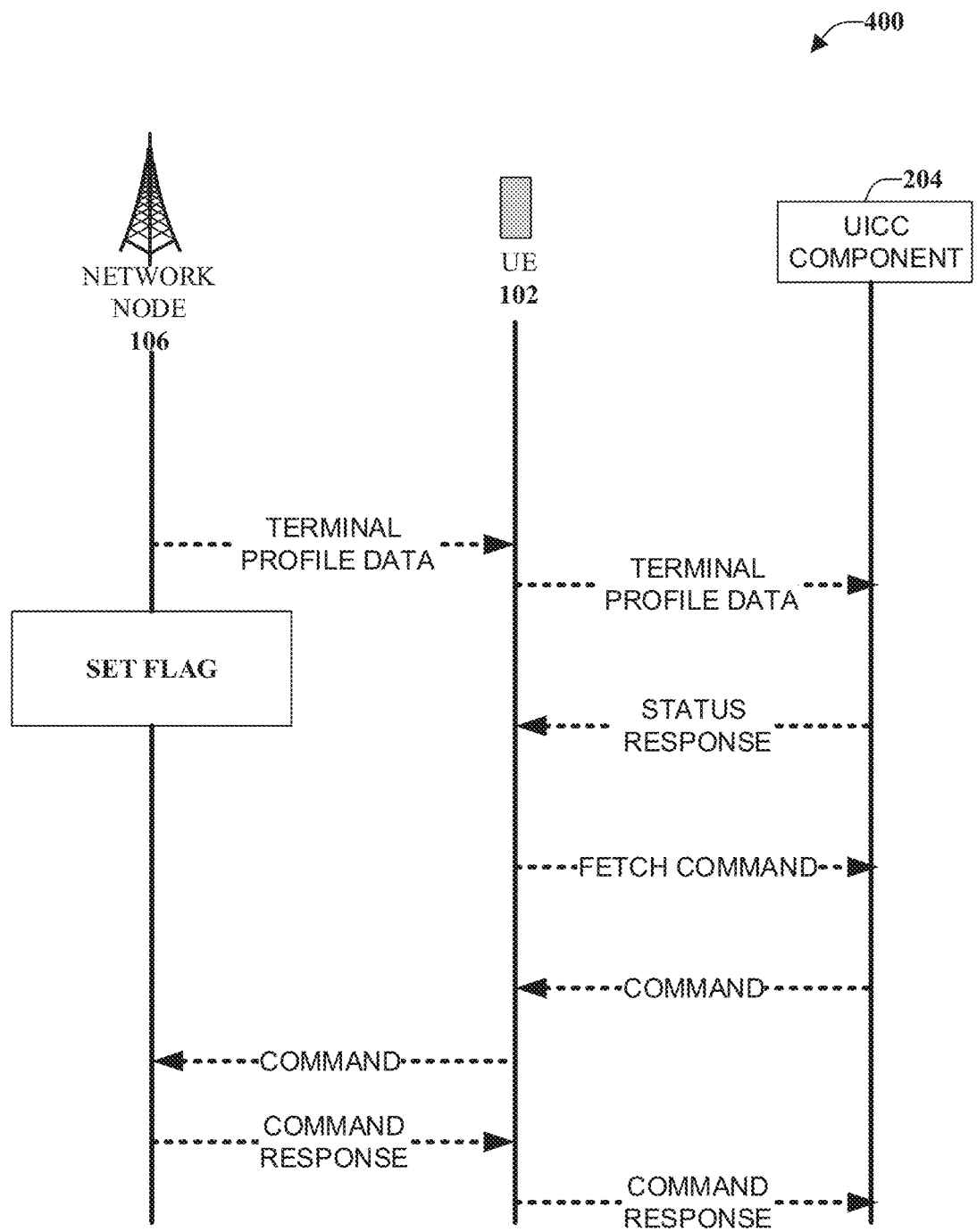
FIG. 4 illustrates an example schematic system block diagram of default subcarrier spacing management according to one or more embodiments.

Referring now to FIG. 4, illustrated is an example schematic system block diagram of default subcarrier spacing management according to one or more embodiments. As depicted in FIG. 4, the system 400 can initiate default subcarrier spacing management by facilitating sending terminal profile data from the network node 106 to the UE 102. The terminal profile data can comprise: international mobile equipment identity (IMEI), international mobile equipment identity software version (IMEISV), terminal profile, location, MCC, MNC, LAC, TAC, cell ID, terminal support table contents, etc. The terminal profile data can then be sent from the UE 102 to the UICC component 204 to inform the UICC component 204 of the capabilities of the UE 102. Thereafter, the UICC component 204 can send a status response (e.g., response command, 91.xxx, 90 00, etc.) to the UE 102. Based on the status response, the UE 102 can send a fetch command to the UICC component 204 to obtain a command (e.g., the stored default SCS) from the UICC component 204. In response to the fetch command, the UICC component 204 can send the stored default SCS data to the UE 102, which can then be sent to the network node 106 from the UE 102. The network node 106 can then generate and/or send a command response (an acknowledgement, a negative acknowledgement, etc.) to the UE 102, which can then pass the command response on to the UICC component 204. If the stored default SCS from the UICC component 204 does not match that of the current network configuration (as indicated by the flag), then the network node 106 can send an over the air message to the UE 102 to indicate to the UE 102 to change its SCS.

Figure 5:
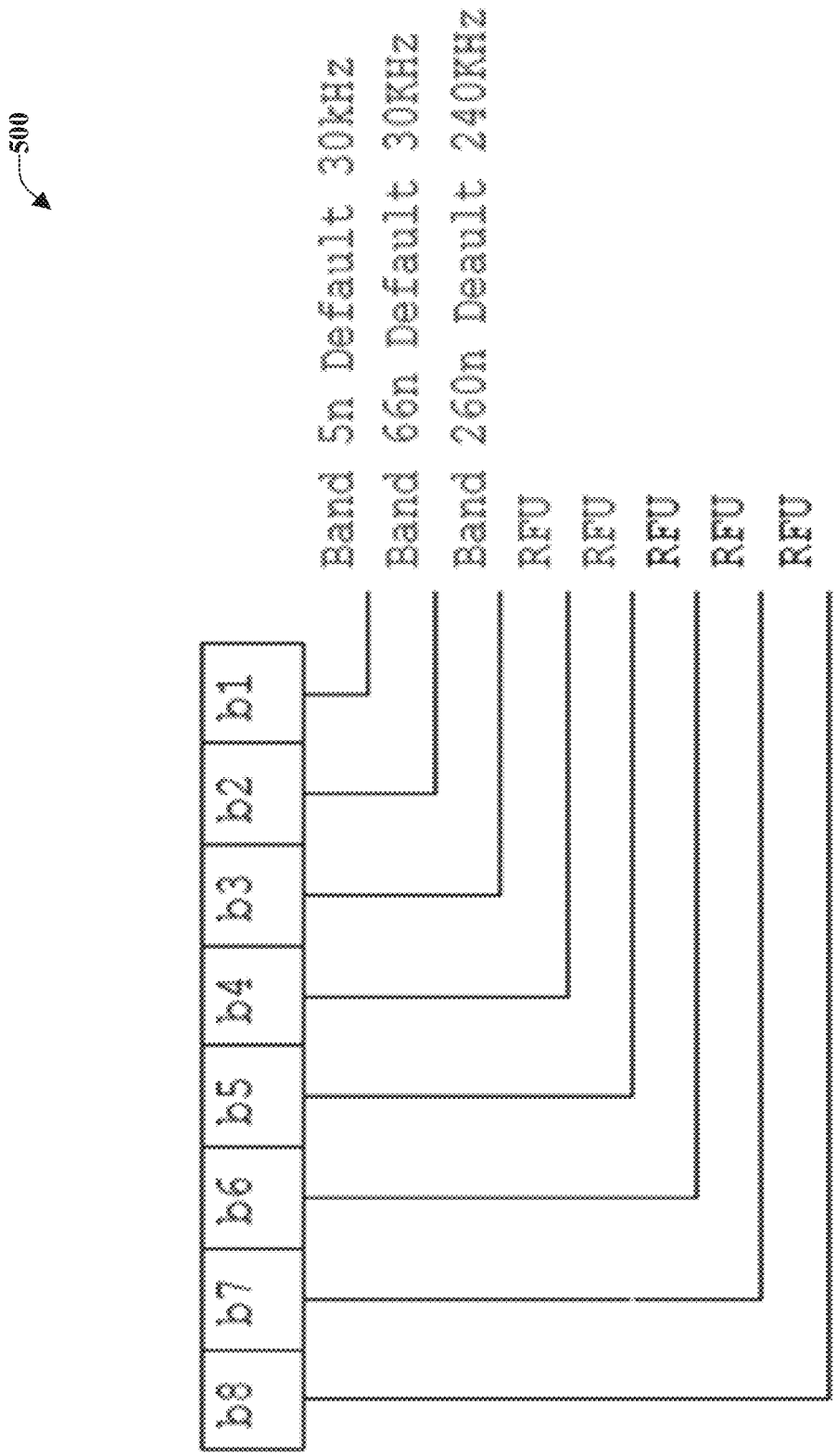
FIG. 5 illustrates an example schematic system block diagram of network flag data according to one or more embodiments.
Figure 6:
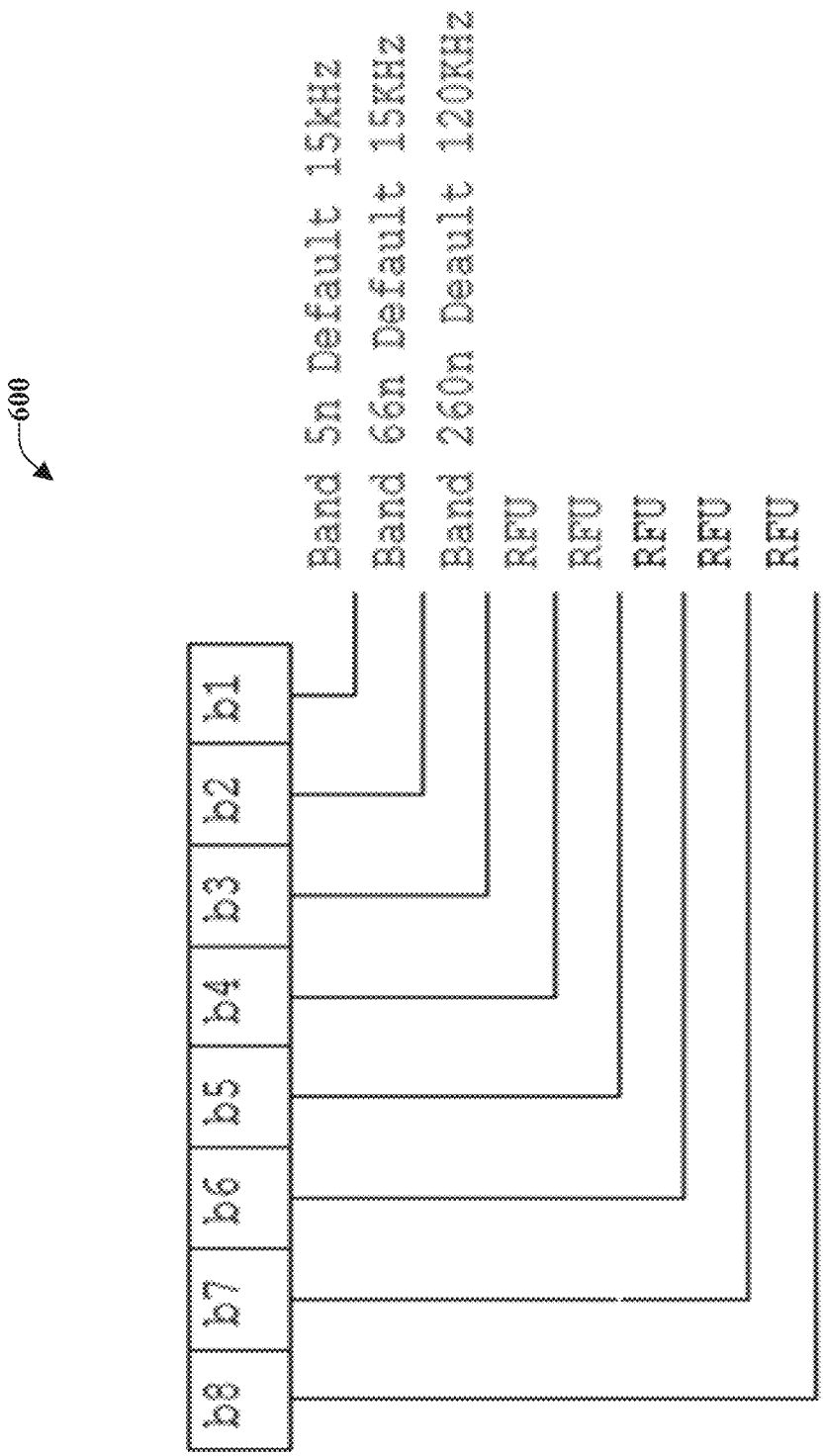
FIG. 6 illustrates an example schematic system block diagram of network flag data according to one or more embodiments.

Referring now to FIGS. 5 and 6 illustrated are example schematic system block diagrams of network flag data according to one or more embodiments. FIG. 5 depicts a state of the wireless communication system 100 when the flag is "on" for SCS for SS or PBCH supported features. Thus, the default SCS for the band 5n and band 66n can be set as 30 kHz for the SS or the PBCH block. The default SCS for the band 260n can be set as 240 KHz for the SS or the PBCH block. Alternatively, if the flag is "off", then the default SCS for the band 5n and the band 66n can be set as 15 kHz for the SS or the PBCH block as depicted in FIG. 6. Additionally, the default SCS for the band 260n can be set as 120 KHz for the SS or the PBCH block.

Figure 7:
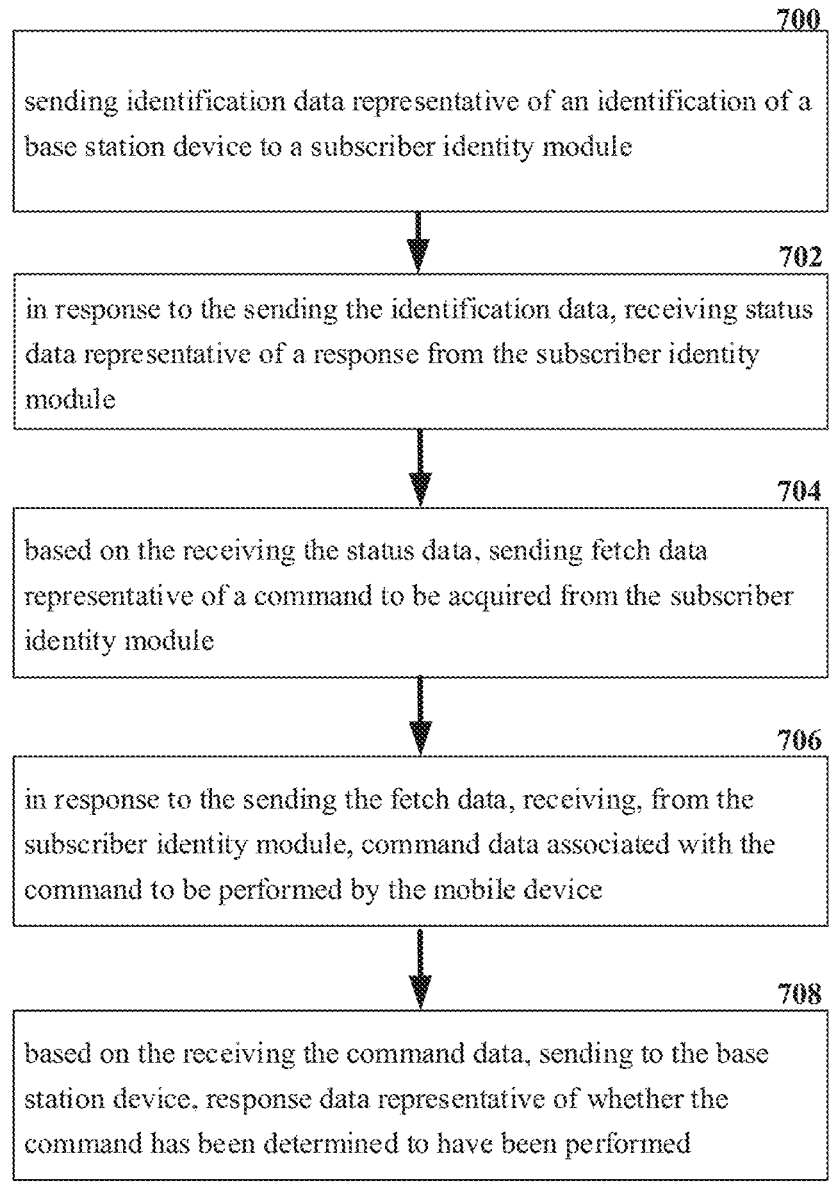
FIG. 7 illustrated is an example flow diagram for a method for dynamically managing default subcarrier spacing according to one or more embodiments.

Referring now to FIG. 7, illustrated is an example flow diagram for dynamically managing default subcarrier spacing. In one embodiment, at element 700 a method can comprise sending (e.g., from the UE 102) identification data representative of an identification of a base station device to a subscriber identity module. At element 702, in response to the sending the identification data, the method can comprise receiving (e.g., by the UE 102) status data representative of a response from the subscriber identity module, and based on the receiving the status data, the method can comprise sending (e.g., from the UE 102), fetch data representative of a command to be acquired from the subscriber identity module at element 704. Additionally, at element 706 the method can comprise receiving (e.g., by the UE 102), from the subscriber identity module, command data associated with the command to be performed by the mobile device. Furthermore, based on the receiving the command data, the method can comprise sending (e.g., from the UE 102), to the base station device, response data representative of whether the command has been determined to have been performed at element 708.

Figure 8:
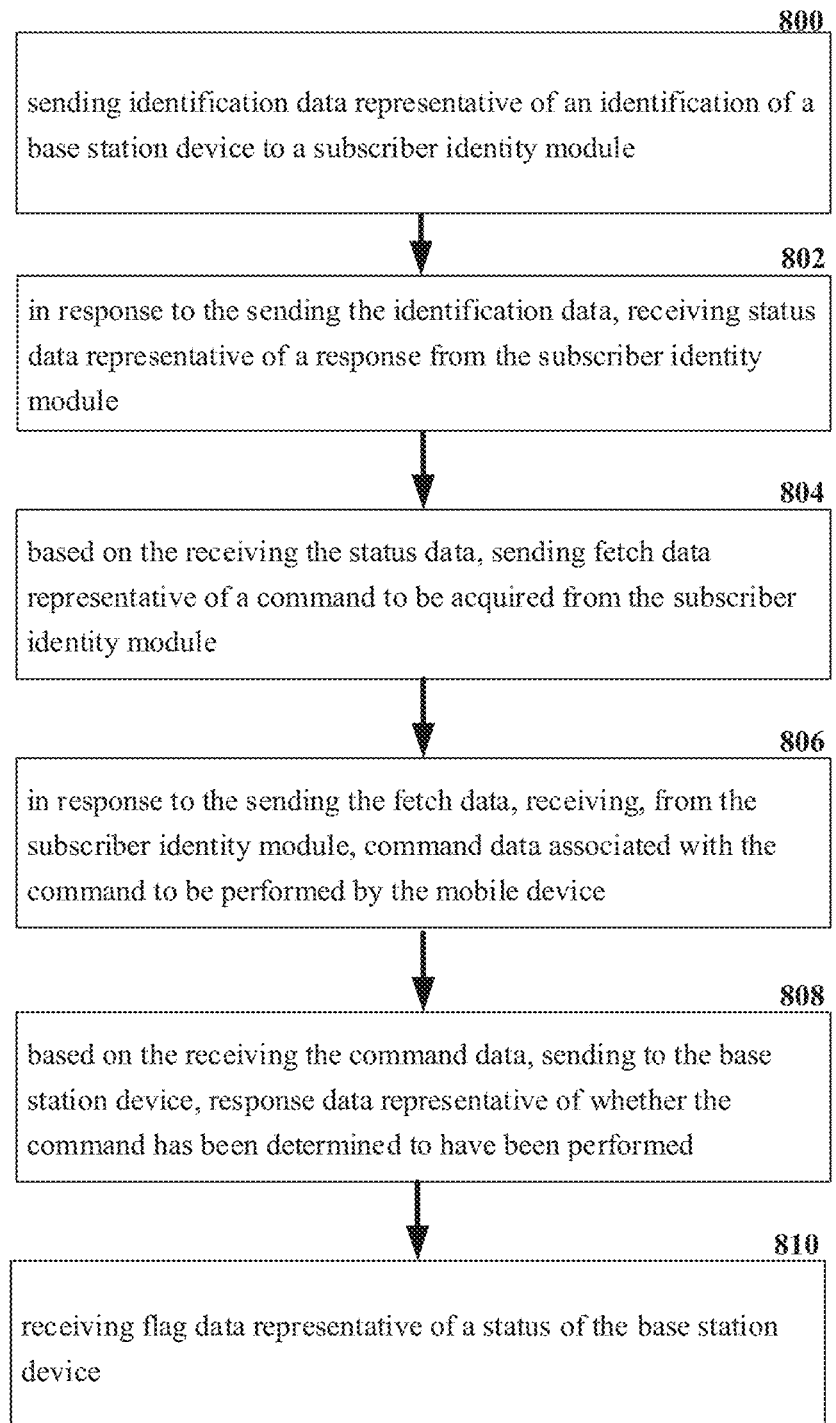
FIG. 8 illustrated is an example flow diagram for another method for dynamically managing default subcarrier spacing according to one or more embodiments.

Referring now to FIG. 8, illustrated is an example flow diagram for dynamically managing default subcarrier spacing. In another embodiment, at element 800 a method can comprise sending (e.g., from the UE 102) identification data representative of an identification of a base station device to a subscriber identity module. At element 802, in response to the sending the identification data, the method can comprise receiving (e.g., by the UE 102) status data representative of a response from the subscriber identity module, and based on the receiving the status data, the method can comprise sending (e.g., from the UE 102), fetch data representative of a command to be acquired from the subscriber identity module at element 804. Additionally, at element 806 the method can comprise receiving (e.g., by the UE 102), from the subscriber identity module, command data associated with the command to be performed by the mobile device. Furthermore, based on the receiving the command data, the method can comprise sending (e.g., from the UE 102), to the base station device, response data representative of whether the command has been determined to have been performed at element 808. Additionally, at element 810, the method can comprise receiving (e.g., by the UE 102) flag data representative of a status of the base station device.

Figure 9:
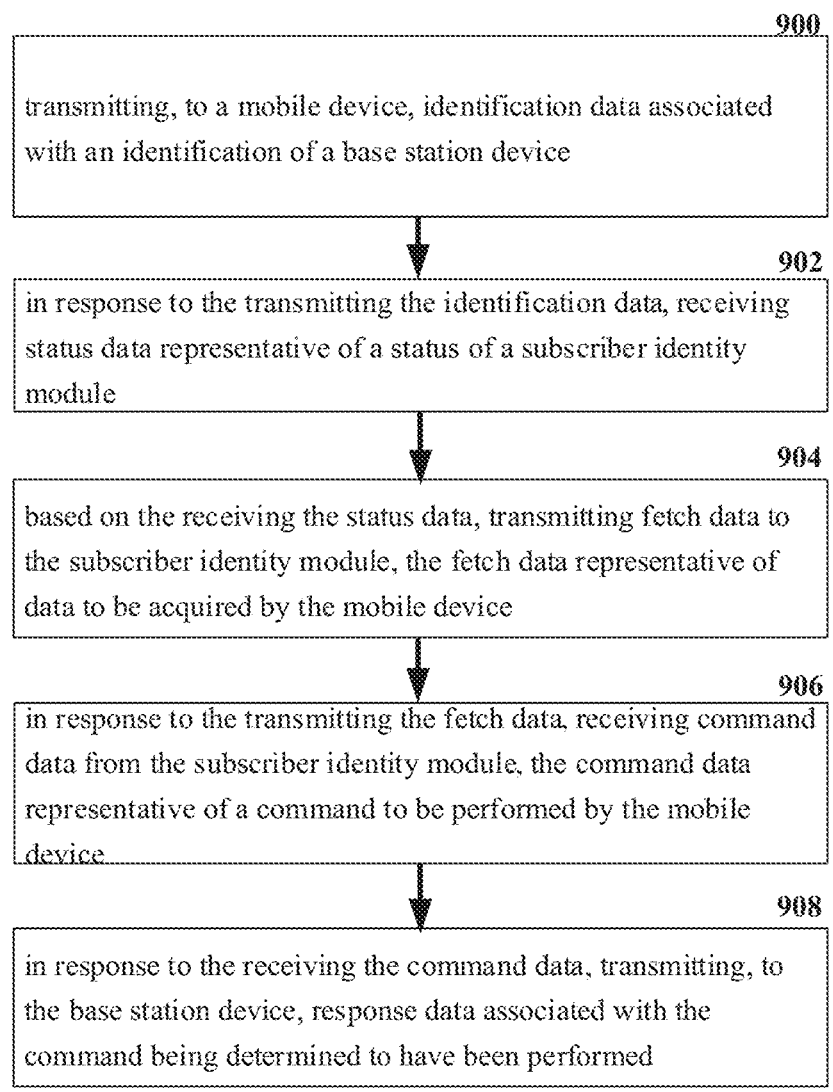
FIG. 9 illustrated is an example flow diagram for a system for dynamically managing default subcarrier spacing according to one or more embodiments.

Referring now to FIG. 9, illustrated is an example flow diagram for dynamically managing default subcarrier spacing. According to yet another embodiment, at element 900, a system can facilitate, transmitting (e.g., from the network node 106), to a mobile device, identification data associated with an identification of a base station device (e.g., the network node 106). In response to the transmitting the identification data, the system can facilitate receiving status data (e.g., from the UICC component 204) representative of a status of a subscriber identity module at element 902. Based on the receiving the status data, the system can transmit fetch data (e.g., via the UE 102) to the subscriber identity module, the fetch data representative of data to be acquired by the mobile device at element 904. Additionally, at element 906, in response to the transmitting the fetch data, the operations can comprise receiving (e.g., via the UE 102) command data from the subscriber identity module, the command data representative of a command to be performed by the mobile device. Furthermore, in response to the receiving the command data, the operations can comprise transmitting (e.g., via the UE 102), to the base station device, response data associated with the command being determined to have been performed at element 908.

Figure 10:
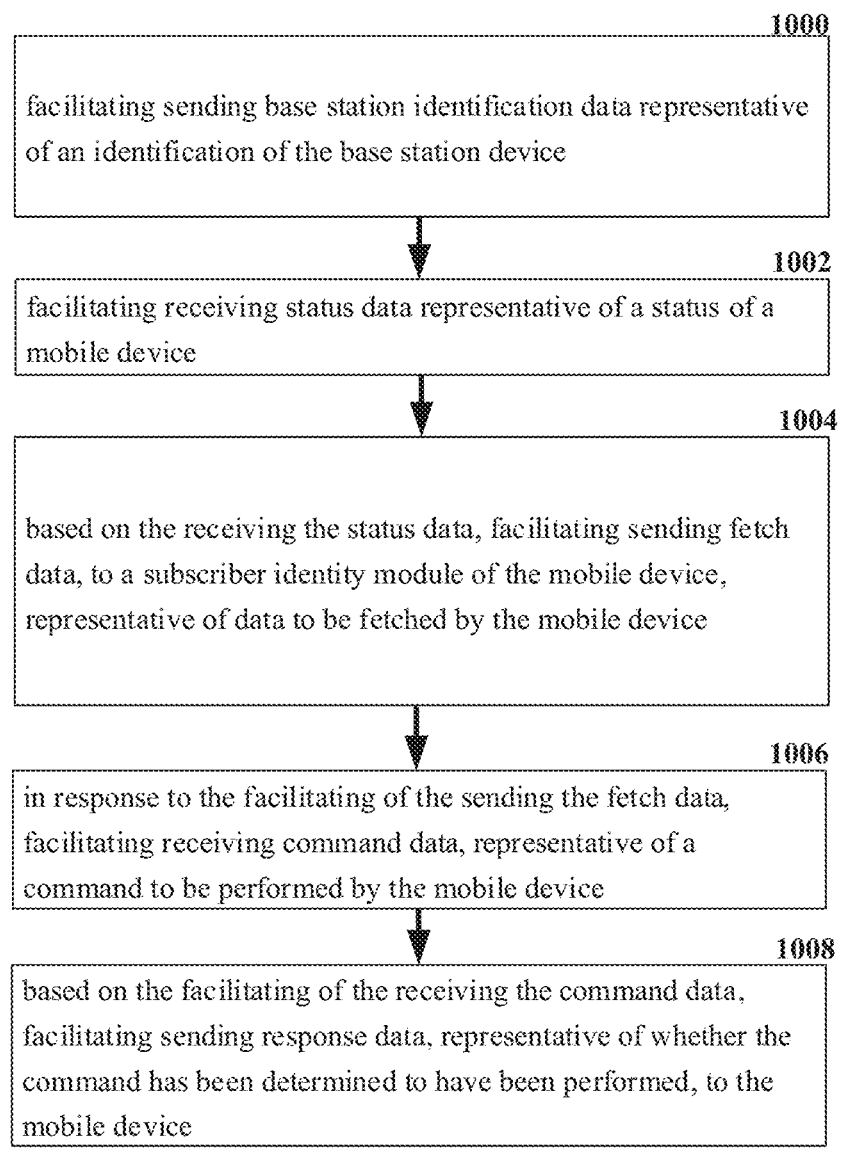
FIG. 10 illustrated is an example flow diagram for a machine-readable storage medium for dynamically managing default subcarrier spacing according to one or more embodiments.

Referring now to FIG. 10, illustrated is an example flow diagram for dynamically managing default subcarrier spacing. According to yet another embodiment, a machine-readable storage medium can perform the operations comprising facilitating sending base station identification data (e.g., from the network node 106) representative of an identification of the base station device at element 1000 and facilitating receiving (e.g., from the UE 102) status data representative of a status of a mobile device at element 1002. Based on the receiving the status data, the machine-readable storage medium can facilitate sending fetch data (e.g., from the UE 102), to a subscriber identity module of the mobile device, representative of data to be fetched by the mobile device at element 1004. Additionally, in response to the facilitating of the sending the fetch data, the machine-readable storage medium can facilitate receiving (e.g., via the UE 102) command data, representative of a command to be performed by the mobile device at element 1006. Furthermore, based on the facilitating of the receiving the command data, the machine-readable storage medium can perform the operations comprising facilitating sending response data (e.g., via the interface component 306), representative of whether the command has been determined to have been performed, to the mobile device at element 1008.

Figure 11:
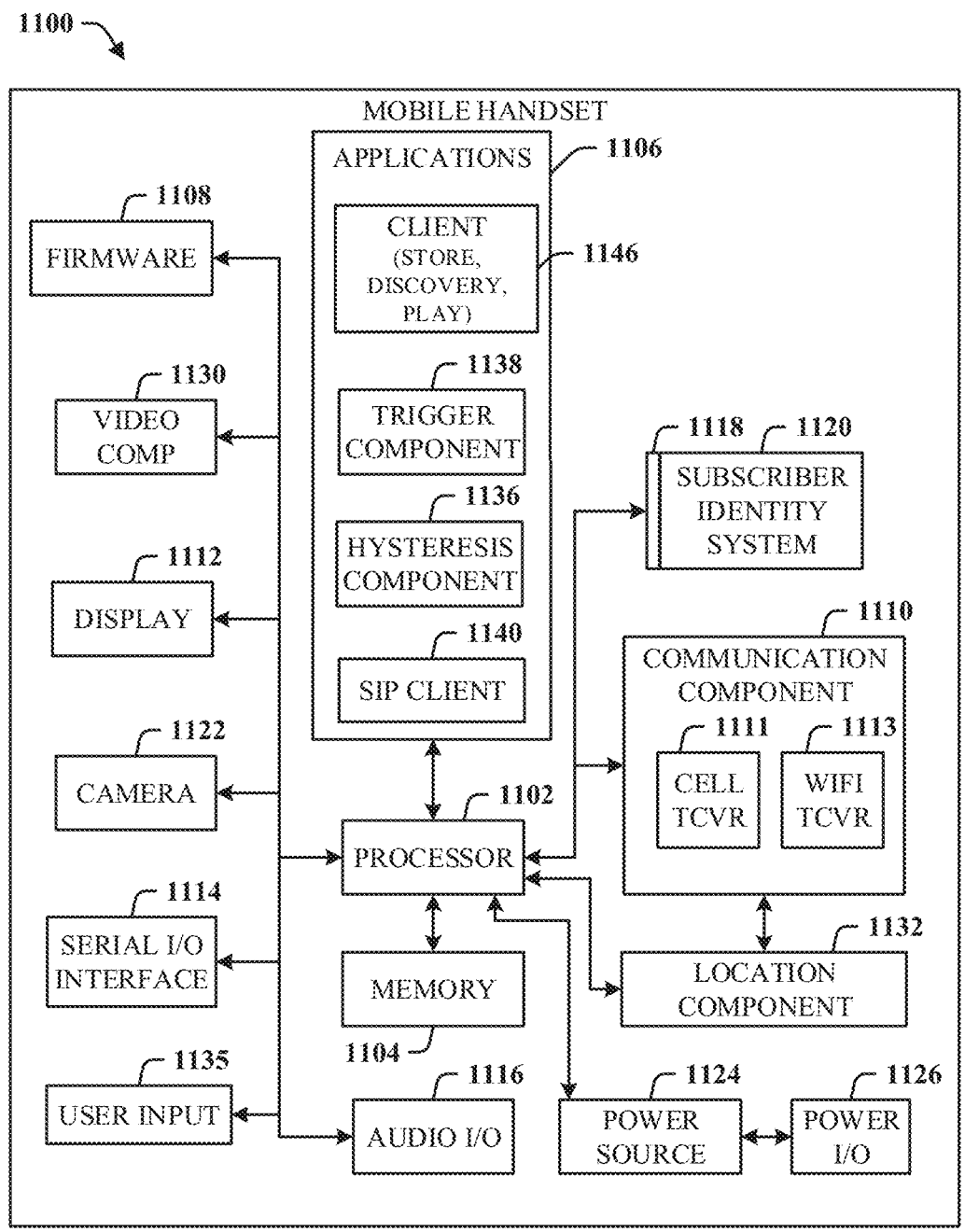
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
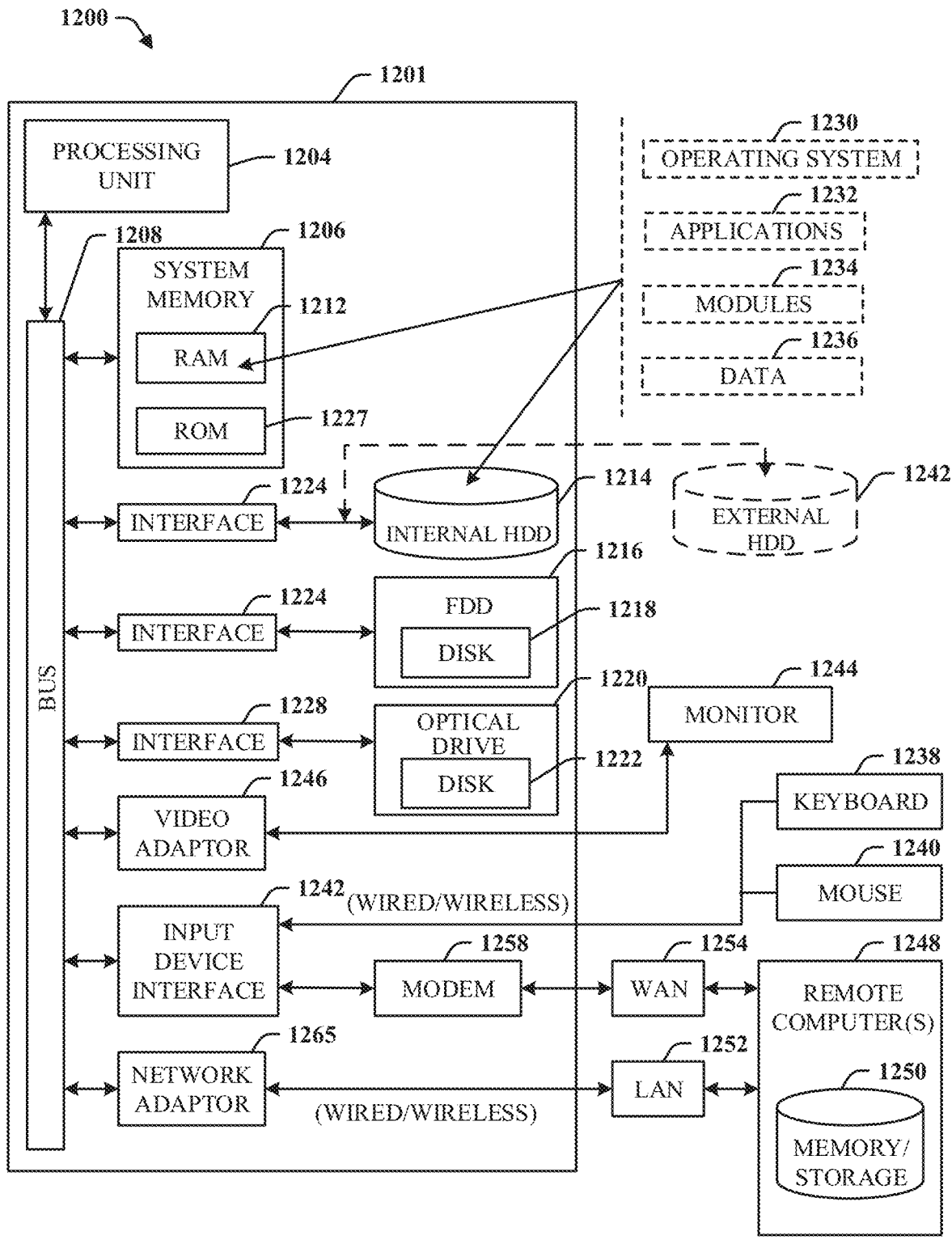
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    sending, by a mobile device comprising a processor, identification data representative of an identification of a base station device to a subscriber identity module;
    in response to the sending the identification data, receiving, by the mobile device, status data representative of a response from the subscriber identity module;
    based on the receiving the status data, sending, by the mobile device, fetch data representative of a command to be acquired from the subscriber identity module;
    in response to the sending the fetch data, receiving, by the mobile device from the subscriber identity module, command data associated with the command to be performed by the mobile device;
    based on the receiving the command data, sending, by the mobile device to the base station device, response data representative of whether the command has been determined to have been performed; and
    in response to the mobile device registering with the base station device, receiving, by the mobile device, a synchronization signal associated with the registering.

2. The method of claim 1, wherein the mobile device comprises the subscriber identity module operable to receive the identification data.

3. The method of claim 2, further comprising:
    receiving, by the mobile device, flag data representative of a status of the base station device.

4. The method of claim 3, further comprising:
    based on a condition associated with the flag data being determined to have been satisfied, receiving, by the mobile device, a subcarrier spacing associated with a synchronization signal block.

5. The method of claim 3, further comprising:
    based on a condition associated with the flag data being determined not to have been satisfied, receiving, by the mobile device, a subcarrier spacing associated with a synchronization signal block.

6. The method of claim 3, further comprising:
    based on a condition associated with the flag data being determined to have been satisfied, receiving, by the mobile device, a subcarrier spacing associated with a physical broadcast channel block.

7. The method of claim 3, further comprising:
    based on a condition associated with the flag data being determined not to have been satisfied, receiving, by the mobile device, a subcarrier spacing associated with a physical broadcast channel block.

8. The method of claim 1, wherein the synchronization signal is a first synchronization signal, and the method further comprising:
    in response to a change in a network configuration associated with the base station device, receiving, by the mobile device, a second synchronization signal, which is different than the first synchronization signal, to override the first synchronization signal.

9. The method of claim 8, wherein the second synchronization signal is received by the mobile device via an over the air message.

10. A system, comprising:
    a processor; and
    a memory that stores executable instructions that, when executed by the processor, facilitate performance of operations, comprising:
        transmitting, to a mobile device, identification data associated with an identification of a base station device;
        in response to the transmitting the identification data, receiving status data representative of a status of a subscriber identity module;
        based on the receiving the status data, transmitting fetch data to the subscriber identity module, the fetch data representative of data to be acquired by the mobile device;
        in response to the transmitting the fetch data, receiving command data from the subscriber identity module, the command data representative of a command to be performed by the mobile device;
        in response to the receiving the command data, transmitting, to the base station device, response data associated with the command being determined to have been performed; and
        in response to the mobile device being determined to have registered with the base station device, generating synchronization data associated with a synchronization signal associated with the mobile device.

11. The system of claim 10, wherein the operations further comprise:
    sending the synchronization signal to the mobile device via an over the air signal.

12. The system of claim 10, wherein the mobile device comprises the subscriber identity module operable to receive the identification data.

13. The system of claim 10, wherein the operations further comprise:
    based on a condition associated with the flag data being determined to have been satisfied, facilitating setting a subcarrier spacing associated with the synchronization signal.

14. The system of claim 13, wherein the synchronization signal is a first synchronization signal, and wherein the operations further comprise:
    in response to the mobile device registering with the base station device, facilitating storing a second synchronization signal associated with the subcarrier spacing.

15. A non-transitory machine-readable storage medium, comprising executable instructions that, when executed by a processor of a base station device, facilitate performance of operations, comprising:
    facilitating sending base station identification data representative of an identification of the base station device;
    facilitating receiving status data representative of a status of a mobile device;
    based on the receiving the status data, facilitating sending fetch data, to a subscriber identity module of the mobile device, representative of data to be fetched by the mobile device;
    in response to the facilitating of the sending the fetch data, facilitating receiving command data, representative of a command to be performed by the mobile device;
    based on the facilitating of the receiving the command data, facilitating sending response data, representative of whether the command has been determined to have been performed, to the mobile device; and in response to the mobile device being determined to have registered with the base station device, generating synchronization data associated with a synchronization signal associated with the mobile device.

16. The non-transitory machine-readable storage medium of claim 15, wherein the operations further comprise:

in response to the facilitating the sending the base station identification data, facilitating generating flag data representative of a status of the base station device.

17. The non-transitory machine-readable storage medium of claim 16, wherein the operations further comprise:

based on a condition associated with the flag data being determined to have been satisfied, facilitating setting a subcarrier spacing associated with the synchronization signal.

18. The non-transitory machine-readable storage medium of claim 17, wherein the synchronization signal is a first synchronization signal, and wherein the operations further comprise:

in response to the mobile device registering with the base station device, facilitating storing a second synchronization signal associated with the subcarrier spacing.

19. The non-transitory machine-readable storage medium of claim 15, wherein the mobile device comprises the subscriber identity module, and wherein the subscriber identity module is configured to receive the base station identification data.

20. The non-transitory machine-readable storage medium of claim 15, wherein the operations further comprise:

facilitating sending, to the mobile device via an over the air message, the synchronization signal.

* * * * *